Patented Jan. 29, 1946

2,393,673

UNITED STATES PATENT OFFICE 2,393,673

SUBSTITUTED 4-AMINO BENZOIC ACID

Orville Wyss and Bernard J. Ludwig, Bloomfield, N. J., and Martin Rubin, New York, N. Y., assignors to Wallace & Tiernan Products, Inc., a corporation of New York No Drawing. Application January 20, 1943,
Serial No. 473,038

2 Claims. (Cl. 167—30)

This invention relates to certain nuclear monosubstituted 4-aminobenzoic acids and particularly to bactericidal compositions including such compounds.

The compounds to which the invention relates are derivatives of 4-aminobenzoic acid. This parent substance is not an effective antimicrobial; on the contrary, it is an essential nutrile and growth stimulant for several species of bacteria. Other species of bacteria that do not require the presence of 4-aminobenzoic acid in the nutrient medium are considered to be able to synthesize the acid and thus supply their requirement of it. Now it has been found that by simple substitution the para-aminobenzoic acid is converted from a stimulant to an inhibitor of bacterial growth.

The invention comprises the herein described monosubstituted 4-aminobenzoic acids, the substituent being in the nucleus, that is, attached to a carbon atom of the benzene ring. More particularly, the invention comprises antimicrobial compositions including or consisting essentially of such compounds and a carrier therefor.

The monosubstituted 4-aminobenzoic acid compounds that have been found to be effective and the results of illustrative tests of them as antimicrobials are shown in the following tabulation.

Antimicrobials

| Substituted aminobenzoic acid compound | Concentration, mg. per cent, required for half inhibition of bacterial growth |
| --- | --- |
| 3-chloro-4-aminobenzoic acid | 8 |
| 2-chloro-4-aminobenzoic acid | 1 |
| 3-bromo-4-aminobenzoic acid | 25 |
| 3-fluoro-4-aminobenzoic acid | 4 |
| 2-amino-4-aminobenzoic acid (2-4-diamino benzoic acid) | 15 |
| 3-amino-4-aminobenzoic acid (3-4-diaminobenzoic acid) | 3 |
| 2-nitro-4-aminobenzoic acid | 20 |

The 2-chloro compound is preferred because its activity as an antimicrobial is the greatest. All of the other compounds, however, are satisfactory.

The data for the above table were obtained by tests on the aminobenzoic acid derivatives in a synthetic medium inoculated with 100,000 *Escherichia coli* for 1 ml. As an end point for measuring comparative activity, there was determined the concentration of the compound which permitted bacterial growth equal to half of that of a control sample in which there was not included any antimicrobial.

It will be observed that these compounds have a strong antibacterial action, a conclusion that has been confirmed by tests against other microorganisms. Thus, *Staphylococcus aureus* was tested with similar results.

While the invention is not limited to any theory of explanation of the effect of the introduction of the substituent in changing completely the bacterial relationship of the 4-aminobenzoic acid, the following discussion gives a more or less mechanical representation of what is considered to be the principal cause of the effect obtained.

Para-aminobenzoic acid is now generally considered to be an essential part of an enzyme system of bacteria. Presumably this enzyme system consists to a large extent of a specific protein carrier and a prosthetic group or adduct of which para-aminobenzoic acid is an essential part, the carrier and the adduct being combined or associated together as by acidic and basic charges, by hydrogen bonds, or by other residuary linkages.

It is considered that the nuclear monosubstituted compounds of the present invention resemble the parent substance, para-aminobenzoic acid, in spatial arrangement, particularly in the arrangement of charges, and enter the enzyme system so as to block the entrance of the para-aminobenzoic acid itself into the position necessary for the growth of bacteria.

The preparation of some of these products has been described in the literature. Such products may be made as there described. The 3-chloro, and 3-fluoro derivatives of para-aminobenzoic acid are not only particularly satisfactory for the present purpose but also are considered to be new compounds. The preparation and certain identifying properties of these compounds are therefore described below.

Preparation of 3-chloro-4-aminobenzoic acid

The compound 3-chloro-4-aminobenzoic acid is prepared as follows:

3-chloro-4-acetamidotoluene is first prepared according to Dakin and Cohn (Journal of the Chemical Society, 81, 1336, 1902). Sixty grams (g.) of this material were refluxed with stirring with a solution of 146 g. of potassium permanganate and 103 g. of magnesium sulfate in 6000 cc. of water, the technique being that described in Houben "The Methods of Organic Chemistry" vol. II, page 15. After four hours of refluxing, the slight excess of permanganate was removed by the addition of 20 cc. of 40% aqueous formalin solution. After the resulting mixture was cooled to room temperature, 1000 cc. of 10% solution of sodium hydroxide in water were added and the mixture then filtered. The filtrate was acidified, whereupon 40 g. of 3-chloro-4-acetamidobenzoic acid was obtained. The melting point of this intermediate was 234–6° C. 100 grams of the 3-chloro-4-acetamidobenzoic acid were hydrolyzed by refluxing for 1½ hours in 1000 cc. of 10% alcoholic hydrochloric acid solution. Then 1000 cc. of water were added to the hydrolyzed mixture and the alcohol removed by distillation. The remaining aqueous solution was then cooled to about room temperature and the pH adjusted by the addition of sodium carbonate to 4 to 5. Crystals appeared. These crystals were separated and recrystallized from hot water.

The product is the desired 3-chloro-4-aminobenzoic acid. It is a white crystalline material of melting point approximately 225.5° to 227° C., uncorrected. Analysis of the specimen made as described showed 20.6% of chlorine as compared to 20.7% calculated from the formula for the desired compound, the difference being well within the experimental error in the analysis.

The same product may be prepared from 4-benzamido-3-chlorotoluene by an analogous method or by the direct chlorination of para-aminobenzoic acid and fractionating the mixture of materials obtained so as to produce a fraction of the melting point stated above.

*Preparation of 3-fluoro-4-aminobenzoic acid*

3-fluoro-4-aminobenzoic acid is made as follows:

4-nitro-3-fluorotoluene is first prepared, for instance, according to the method of Gunther and Schilmann (Berichte 62B, 1794–1805, 1929). Twenty g. of this product were heated with stirring under reflux for 4 hours with a solution of 52 g. of potassium permanganate in 2600 cc. of water. The reaction mixture was cooled to room temperature, filtered and acidified with hydrochloric acid. There is thus formed a precipitate of 4-nitro-3-fluorobenzoic acid. This precipitate was removed by filtration. After drying it was found to have a melting point of 174–175° C. uncorrected and on analysis to show carbon 45.7% and hydrogen 2.5% as compared to 45.4% and 2.2%, respectively, calculated for the said compound.

The 4-nitro compound was then reduced. One g. of it was dissolved in 2 cc. of concentrated aqueous ammonium hydroxide solution and treated with 10 g. of ferrous sulfate previously dissolved in 20 cc. of warm water. The mixture was refluxed for 1 hour, then diluted with 20 cc. of water, and then filtered.

The clear filtrate was evaporated to 20 cc. and the pH of it adjusted by the addition of acetic acid to 4 to 5.

When the resulting mixture was allowed to stand overnight the 3-fluoro-4-aminobenzoic acid crystallized in clusters of short needles. After recrystallization from hot water, the crystals melted at 215° to 216° C., uncorrected. It crystallizes in the form of pale yellow needles and on analysis shows carbon 54.3% and hydrogen 4.2% as compared to the calculated percentages of 54.3% and 3.9%, respectively.

As proof of the structure of the compound obtained, the intermediate compound 3-fluoro-4-nitrobenzoic acid was converted by heating with sodium methoxide into the known 3-methoxy-4-nitrobenzoic acid melting at 233° C. On mixing this product with an authentic sample of 3-methoxy-4-nitrobenzoic acid and determining the melting point of the mixture, there was found to be no depression in melting point from the 233° C., this failure to lower the melting point indicating the identity of the two materials mixed.

In applying as antimicrobials the monosubstituted-4-aminobenzoic acid compounds described above, they are used with a carrier, as, for example in solution in water or other solvents, or dissolved and suspended in various ointments and creams.

It will be understood that it is intended to cover all changes and modifications of the example of the invention herein chosen for the purpose of illustration which do not constitute departures from the spirit and scope of the invention.

What is claimed is:

1. The method of inhibiting bacterial action which comprises contacting bacteria with a nuclear mono-substituted-4-aminobenzoic acid selected from the group consisting of 3-chloro-4-aminobenzoic acid, 2-chloro-4-aminobenzoic acid, 3-bromo-4-aminobenzoic acid, 3-fluoro-4-aminobenzoic acid, 2-amino-4-aminobenzoic acid (2-4-diaminobenzoic acid), 3-amino-4-aminobenzoic acid (3-4-diaminobenzoic acid), and 2-nitro-4-aminobenzoic acid.

2. The method of inhibiting bacterial action which comprises contacting the bacteria with 2-chlor-4-aminobenzoic acid.

ORVILLE WYSS.
BERNARD J. LUDWIG.
MARTIN RUBIN.